(12) United States Patent
Choudhary et al.

(10) Patent No.: US 6,197,719 B1
(45) Date of Patent: Mar. 6, 2001

(54) PROCESS FOR THE ACTIVATION OF PEROVSKITE TYPE OXIDE

(75) Inventors: Vasant Ramchandra Choudhary; Subhabrata Banerjee, both of Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/285,107

(22) Filed: Apr. 1, 1999

Related U.S. Application Data

(63) Continuation-in-part of application No. 09/257,105, filed on Feb. 24, 1999, now abandoned.

(30) Foreign Application Priority Data

Feb. 12, 1999 (IN) .......................................... 230/99

(51) Int. Cl.$^7$ ...................................................... B01J 23/00
(52) U.S. Cl. ................. 502/300; 502/302; 502/303; 502/305; 502/306; 502/309; 502/310; 502/312; 502/314; 502/315; 502/316; 502/318; 502/319; 502/321; 502/322; 502/324; 502/327; 502/330; 502/337; 502/338; 502/339; 502/351; 502/354; 423/594; 423/595; 423/598; 423/599
(58) Field of Search .................................... 502/302, 303, 502/326, 330, 338, 324, 25, 26, 56, 50, 55, 525, 305, 306, 309, 310, 312, 314–316, 318, 319, 321, 322, 327, 337, 339, 351, 354; 423/594, 595, 598, 599

(56) References Cited

U.S. PATENT DOCUMENTS

| | | | |
|---|---|---|---|
| 4,046,869 | * | 9/1977 | Dorawala et al. . |
| 4,221,827 | * | 9/1980 | Parry et al. . |
| 4,446,011 | * | 5/1984 | Wheelock et al. . |
| 5,447,705 | * | 9/1995 | Petit et al. ............................ 502/303 |

* cited by examiner

*Primary Examiner*—Steven P. Griffin
*Assistant Examiner*—Cam N. Nguyen
(74) *Attorney, Agent, or Firm*—Ladas and Parry

(57) ABSTRACT

A process for the activation of perovskite-type oxide by increasing its surface area and/or catalytic activity, which comprises: (i) treating perovskite-type oxide hydrothermally with liquid water with water/perovskite-type oxide ratio of above 0.1 at temperature of 50°–500° C. and period of 0.1–100 h under autogeneous pressure and drying the resulting mass or treating perovskite-type oxide hydrothermally with water vapors with or without any inert gas at space velocity of above 100 h$^{-1}$, temperature of 200°–1000° C. and a period of 0.1–100 h and (ii) calcining the hydrothermally treated perovskite-type oxide in air or inert gas or under vacuum at temperature of 300°–1000° C. for a period of 0.1–100 h.

12 Claims, No Drawings

PROCESS FOR THE ACTIVATION OF PEROVSKITE TYPE OXIDE

This is a continuation-in-part of application Ser. No. 09/257,105 filed on Feb. 24, 1999, now abandoned, claims the benefit thereof and incorporates the same by reference.

This invention relates to a process for the activation of perovskite-type oxide by hydrothermal treatment so that surface area and/or catalytic activity of the perovskite-type oxide is increased. This invention particularly relates to a process for the activation of perovskite-type oxide, which has a low surface area or which is deactivated due to sintering or crystal growth, by its hydrothermal treatment so that surface area and/or catalytic activity of the perovskite-type oxide is increased.

The process of this invention could be used for the activation of perovskite-type oxides, useful as catalysts for a number of catalytic combustion and hydrocarbon conversion processes.

BACKGROUND OF THE INVENTION

Perovskite-Type Oxides

A number of $ABO_3$ type perovskite-type oxides, wherein A is a trivalent element such as rare earth element, B is also a trivalent element such as Co, Mn, Fe, Ni, Al, Cr, Sc or noble metal and O is oxygen, are known in the prior art. A large number of variations of this perovskite-type oxides, obtained from a partial substitution at the site A by divalent element such as Sr, Ba and the like and/or at the site B by other trivalent element are also known. Also, the $ABO_3$-type perovskite oxides wherein A is a divalent element such as Ca, Ba, Sr or Pb and B is tetravalent element such as Ti, Zr, Sn or Mn, with or without the partial substitution at the site A by trivalent element, are known in the prior art. Similarly, a number of $A_2BO_4$-type perovskite oxides, wherein A is Ca, Sr or rare earth element and B is Ti, Zr or Cu, with or without partial substitution by other elements at the site A or at the site B or at both the sites, are known. (Ref. L. G. Tejuca et. al. Adv. Catal. 36(1989)237; E. J. Baran, Catal. Today 8(1990)133).

Perovskite-type oxides containing transition metals are good catalysts for the total oxidation of hydrocarbons and carbon monoxide and hence are useful for the CO and hydrocarbon emission control by their complete combustion (Ref. McCarty and Wise, Catal. Today 8(1990)231; Yamazoe and Teraoka, Catal. Today 8(1991)175; Seiyama, Catal. Rev.-Sci. Eng. 34(1992) 281 and B. Viswanathan, Catal. Rev.-Sci. Eng. 34(1992) 337). Perovskite-type oxides are also useful for a number of other catalytic processes, such as partial oxidation of hydrocarbons and oxygenates, hydrogenation and hydrogenolysis of hydrocarbons, hydrogenation of carbon oxides and decomposition of $N_2O$ (Ref. T. Shimizu Catal. Rev.-Sci. Eng.34(1992)355; Ichimura et. al. Catal. Rev.-Sci. Eng.34(1992)301; Fierro, Catal. Rev.-Sci. Eng.34(1992)321; Swamy and Christopher, Catal. Rev.-Sci. Eng.34(1992)409).

Several methods based on the precursor preparation from mixed oxides, freeze-drying, spray drying, co-precipitation and sol-gel, followed by thermal decomposition of the precursor and/or thermal reaction between metal oxides are known in the prior art for the preparation of perovskite-type oxides. However, because of the involvement of high reaction temperature in the formation of perovskite-type oxides, the surface area of the resulting perovskite-type oxides is rather low. For example, the surface areas of the perovskite-type oxides obtained from mixed oxide technique is below 2 $m^2g^{-1}$ and the surface area of perovskite-type oxides obtained from coprecipitation technique are in the range of 1 to 10 $m^2g^{-1}$. Perovskite-type oxides having surface area upto 20 and 30 $m^2g^{-1}$ could be prepared by the prior art processes based on the spray drying and freeze-drying, respectively, of mutually soluble compounds and thereby achieving good chemical homogeneity for perovskite precursors, which are fired at lower temperatures, to get high surface area perovskite-type oxides. However, the use of these processes are limited because of the requirements of mutually soluble compounds and specialized equipments and therefore, the cost of perovskite-type oxide prepared by these processes is high (Ref. Voorhoeve et. al. Science 195(1977)827–833; E. J. Baran, Catal. Today 8(1990)133).

Because of a very slow diffusion of metal cations and $O^{2-}$ anions in solid state, the formation of perovskite-type oxide from non-homogeneously mixed metal oxides requires high temperatures and long reaction period and hence the resulting perovskite-type oxide has a low surface area due to sintering or crystal growth. The temperature for the formation of perovskite-type oxide can however be reduced and thereby the surface area of the perovskite-type oxide can be increased if a homogeneously mixed metal oxides or compounds, which on decomposition or calcination are converted into metal oxides, are used as precursors for the preparation of perovskite-type oxides. But, in practice, it is very difficult to prepare such homogeneously mixed metal oxides, hydroxides or other compounds, which on decomposition or calcination are converted into metal oxides with homogeneous distribution of metal cations.

For perovskite-type oxides to be more active as catalysts, their surface area must be increased. The perovskite-type oxides deactivated due to sintering or crystal growth in the high temperature catalytic processes or other high temperature processes also need to be regenerated by increasing their surface area by some means. Hence there is a great need for increasing the surface area of the perovskite-type oxides, after their preparation by the processes known in the prior art, and thereby increasing the catalytic activity of the perovskite-type oxides. There is also a need of an invention for regenerating the perovskite-type oxides, deactivated due to sintering or crystal growth during catalytic processes, by increasing their surface area and thereby regaining the lost catalytic activity of the perovskite-type oxides.

Accordingly, the primary object of the present invention is to increase the surface area and/or catalytic activity of perovskite-type oxides which have low surface area due to their formation at high temperature or because of their sintering or crystal growth during their use, could be increased.

Thus, it is an object of the present invention to provide a novel process for the activation of perovskite-type oxides, which have low surface area or the surface area of which is decreased due to sintering or crystal growth, so that their surface area is increased.

Another important object of this invention is to provide a novel process for the activation of perovskite-type oxides, so that their catalytic activity is increased.

SUMMARY OF THE INVENTION

This invention provides a process for the activation of perovskite-type oxides, represented by a general formula:

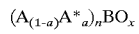

wherein, A is chemical element or mixture of chemical elements selected from rare earth and other trivalent elements; A* is chemical element or mixture of chemical elements selected from alkali and alkaline earth elements, Pb, Cd, Ag, Cu, Sn and other mono and divalent elements; B is chemical element or mixture of chemical elements selected from Sc, Ti, V, Cr, Mn, Fe, Co, Ni, Y, Nb, Mo and noble metal elements; O is oxygen; a is mole fraction of A* in the mixture of A and A* in the range from 0 to 1; x is an integer having a value of 3 and 4 when n=1 and 2, respectively; by increasing the surface area and/or catalytic activity of said perovskite-type oxides, the process for the activation of said perovskite-type oxides comprises:

i) treating said perovskite-type oxide hydrothermally with liquid water with or without containing ammonium hydroxide and/or alkyl ammonium hydroxide at water/perovskite-type oxide weight ratio above about 0.1 in a closed vessel at a temperature between about 50° C. and about 500° C. under autogenous pressure for a period between 0.1 h and about 100 h and then cooling to room temperature, separating the resulting solid mass by filtration, and drying the said mass or treating said perovskite-type oxide with water vapors by contacting it with steam in presence or absence of air or any inert gas at a gas hourly space velocity above 100 $h^{-1}$ at a temperature between about 200° C. and about 1000° C. for a period between about 0.1 h and about 100 h, and ii) calcining the perovskite-type oxide treated in step (i) at a temperature between about 300° C. and about 1000° C. in air or inert gas or under vacuum for a period between about 0.1 h and about 100 h.

The main finding of this invention is that the surface area of said perovskite-type oxides is increased substantially because of their activation by the process of this invention. Other important finding of this invention is that the catalytic activity of said perovskite-type oxides is also increased markedly because of their activation by the process of this invention.

DETAILED DESCRIPTION OF THE INVENTION

Accordingly this invention provides a process for the activation of perovskite-type oxides represented by a general formula:

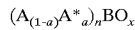

$$(A_{(1-a)}A^*_a)_n BO_x$$

wherein, A is chemical element or mixture of chemical elements selected from rare earth and other trivalent elements; A* is chemical element or mixture of chemical elements selected from alkali and alkaline earth elements, Pb, Cd, Ag, Cu, Sn and other mono and divalent elements; B is chemical element or mixture of chemical elements selected from Sc, Ti, V, Cr, Mn, Fe, Co, Ni, Y, Nb, Mo and noble metal elements; O is oxygen; a is mole fraction of A* in the mixture of A and A* in the range from 0 to 1; x is an integer having a value of 3 and 4 when n=1 and 2, respectively; by increasing the surface area and catalytic activity of said perovskite-type oxides, which comprises:

i) treating said perovskite-type oxide hydrothermally with liquid water with or without containing ammonium hydroxide and/or alkyl ammonium hydroxide at water/perovskite-type oxide weight ratio above about 0.1 in a closed vessel at a temperature between about 50° C. and about 500° C. under autogenous pressure for a period between 0.1 h and about 100 h and then cooling to room temperature, separating the resulting solid mass by filtration, and drying the said mass at or treating said perovskite-type oxide with water vapors by contacting it with steam in presence or absence of air or any inert gas at a gas hourly space velocity above 100 $h^{-1}$ at a temperature between about 200° C. and about 1000° C. for a period between about 0.1 h and about 100 h, and ii) calcining the perovskite-type oxide treated in step (i) at a temperature between about 300° C. and about 1000° C. in air or inert gas or under vacuum for a period between about 0.1 h and about 100 h.

In the process of this invention the preferred water/perovskite-type oxide weight ratio is between about 1.0 and about 3.0; the preferred temperature of the liquid water treatment is between about 100° C. and about 300° C.; the preferred period of the aqueous solution treatment is between about 0.5 h and about 20 h; the preferred temperature of the water vapor treatment is between about 300° C. and about 800° C.; the preferred period of the water vapor treatment is between about 0.5 h and about 20 h; the preferred temperature of calcination in step (ii) is between about 400° C. and about 800° C.; the preferred period of calcination in step (ii) is between about 0.5 h and about 20 h.

The hydrothermal treatment of said perovskite-type oxide in step (i) of this process is essential for its activation. Because of the liquid water treatment or the water vapor treatment to said perovskite-type oxide, the perovskite-type oxide is partially hydrolyzed while maintaining homogeneity of the elements A, A* and B, as defined earlier, present in the parent perovskite-type oxide. During the calcination step (step (ii)) of this process, the partially hydrolyzed perovskite-type oxide is recrystallised forming perovskite-type oxide structure and thereby increasing the surface area and catalytic activity of the parent perovskite-type oxide.

The increase in the surface area of said perovskite-type oxide may be because of the decrease in the crystal size or grain size of the perovskite-type oxide during its activation process. Whereas the increase in the catalytic activity of said perovskite-type oxide may be because of the increase in the surface area of parent perovskite-type oxide and restructuring of the surface of parent perovskite-type oxide or creation of defects in the parent perovskite-type oxide.

Said perovskite-type oxide may be with or without any support or catalyst carrier and binding material.

Perovskite-type oxides with or without any inert support are known in the prior art. Their structure and reactivity and various applications in the catalysis, electro- and photo-catalysis, pollution control, super conductivity, and also as oxygen sensors, ferro-, pyro-, thermo- and piezoelectric materials, semiconductors, fluorescence materials and ferro- and antiferromagnetic materials are also well known (Tejuca et. al. Adv. Catal. 36(1989)237; Baran, Catal. Today. 8(1990)133). The product of the process of this invention, which is an activated perovskite-type oxide, may be useful for these applications.

The present invention reveals that the surface area and/or catalytic activity of the said perovskite-type oxides could be increased by activating them by the process of this invention. By using the process of this invention for activating $LaCoO_3$, the surface area of this perovskite-type oxide can be increased from 0.9 $m^2g^{-1}$ to 16.0 $m^2g^{-1}$ and the conversion of methane in its total combustion at 600° C. and space velocity of 52,000 $cm^3g^{-1}h^{-1}$ over this perovskite-type oxide can be increased from 20% to 64%.

The present invention is described with respect to the following examples illustrating the process of this invention for the activation of perovskite-type oxides and also illustrating the increase in the surface area and/or catalytic activity of parent perovskite-type oxides by their activation by the process of this invention. For illustrating the increase in the catalytic activity of perovskite-type oxides, examples illustrating catalytic combustion of methane over perovskite-type oxides, before and after their activation by the process of this invention, have also been provided. These examples are provided for illustrative purposes only and are not to be construed as limitations on the process of this invention or on the use of the product of this process of invention, activated perovskite-type oxide.

Definition of terms used in the examples:

Conversion of methane (%)=mol % of the methane in feed converted to all products.

Selectivity for $CO_2$ (%)=(conversion of methane to $CO_2$ (%)/conversion of methane to all products (%))×100.

The flow rates of the gases are measured at 0° C. and 1 atmospheric pressure.

Gas hourly space velocity (GHSV) is volume of gas, measured at 0° C. and 1 atmospheric pressure, passed over unit mass of perovskite-type oxide per hour.

Relative intensity of a particular XRD peak (%)=((peak height of a particular peak)/(peak height of the largest XRD peak))×100.

XRD stands for X-ray diffraction.

PTO stands for perovskite-type oxide.

EXAMPLE 1

In this example, the preparation of $LaCoO_3$ perovskite-type oxide by coprecipitation method, known in the prior art, and also the characterization of this perovskite-type oxide for its surface area and also by XRD are described.

$LaCoO_3$ perovskite-type oxide was prepared as follows. An aqueous 117.7 ml 2.8 molar lanthanum nitrate solution was mixed with an aqueous 82.4 ml 4.0 molar cobalt nitrate solution in a glass container and lanthanum and cobalt carbonates were coprecipitated from the solution by adding dropwise an aqueous 1.24 molar sodium carbonate solution under continuous stirring until the pH of the mixture was 8.2. The precipitate was aged in the mother liquor for 1 h and then filtered and washed with distilled water till the wash attained a pH of 7.3. The precipitate was then dried at 100° C. for 16 h and then calcined in static air at 500° C. for 5 h. The calcined mass was washed with boiling water until the filtrate attained a pH of 6.8. The solid mass was then dried at 120° C. for 3 h, pelletized using a hydraulic pressure of 5 ton and 15 mm diameter die. The resulting pellets were fired or calcined at 925° C. for 6 h in static air and then crushed to 52–72 mesh size particles.

The surface area of the perovskite-type oxide was measured by the single point BET method by measuring the adsorption of nitrogen at liquid nitrogen temperature from a $N_2$—He mixture containing 30 mol % $N_2$, using a Monosorb Surface Area Analyzer (Quantachrome Corp. U.S.A.).The surface area of the $LaCoO_3$ perovskite-type oxide was found to be 0.9 $m^2.g^{-1}$.

The perovskite-type oxide was characterized by X-Ray Powder Diffraction method using a Holland Philips PW/1730 x-ray generator with CuKα radiation (λ=1.5405 A°) and a scintillating counter. The 2θ values of prominent XRD peaks and the percent relative intensity of the corresponding XRD peaks for the $LaCoO_3$ perovskite-type oxide were as follows:

| 2θ (degrees): | 32.9° | 33.4° | 47.6° | 58.8° |
|---|---|---|---|---|
| Relative peak intensity.(%): | 100 | 98 | 61 | 40 |

EXAMPLE 2

In this example, the preparation of $LaMn_{0.9}Co_{0.1}O_3$ perovskite-type oxide by coprecipitation method, known in the prior art, and also the characterization of this perovskite-type oxide for its surface area and also by XRD are described.

$LaMn_{0.9}Co_{0.1}O_3$ perovskite-type oxide was prepared by the procedure same as that described in Example 1 except that the mixed aqueous solution used for the coprecipitation was a mixture of 246.2 ml 1.4 molar lanthanum nitrate solution, 138.5 ml 2.24 molar manganese acetate solution and 15.4 ml 2.24 molar cobalt nitrate solution.

The surface area of this perovskite-type oxide was found to be 1.6 $m^2.g^{-1}$.

The 2θ values of the XRD peaks and the percent relative intensity of the prominent XRD peaks for the $LaMn_{0.9}Co_{0.1}O_3$ perovskite-type oxide were as follows:

| 2θ (degrees): | 32.5° | 32.6° | 46.6° | 57.8° |
|---|---|---|---|---|
| Relative peak intensity (%): | 100 | 100 | 56 | 40 |

EXAMPLE 3

In this example, the preparation of $La_{0.8}Sr_{0.2}FeO_3$ perovskite-type oxide by coprecipitation method, known in the prior art, and also the characterization of this perovskite-type oxide for its surface area and also by XRD are described.

$La_{0.8}Sr_{0.2}FeO_3$ perovskite-type oxide was prepared by the procedure same as that described in example 1 except that the mixed aqueous solution used for the coprecipitation was a mixture of 108.1 ml 1.40 molar lanthanum nitrate, 1.9 ml 3.19 molar strontium nitrate and 80.1 ml 2.36 molar ferric nitrate.

The surface area of this perovskite-type oxide was found to be 2.4 $m^2.g^{-1}$.

The 2θ values of the XRD peaks and the percent relative intensity of the prominent XRD peaks for the $La_{0.8}Sr_{0.2}FeO_3$ perovskite-type oxide were as follows:

| 2θ (degrees): | 31.9° | 57.2° | 45.8° | 39.4° |
|---|---|---|---|---|
| Relative peak intensity (%): | 100 | 36 | 31 | 22 |

EXAMPLE 4

This example illustrates the process of this invention for the activation of $LaCoO_3$ perovskite-type oxide, prepared in Example 1, by its hydrothermal treatment with liquid water with or without containing any alkyl ammonium hydroxide, under different process conditions of this invention. This example illustrates that, the surface area and the catalytic activity (in complete combustion of methane) of $LaCoO_3$ perovskite-type oxide, prepared in Example 1, are increased markedly after the activation of this perovskite-type oxide under different conditions by the process of this invention.

The activation of the perovskite-type oxide was carried out in two steps: (i) by treating hydrothermally the perovskite-type oxide with liquid water with or without containing tetrapropyl ammonium hydroxide (TPAOH) in a closed teflon-lined pressure bomb under autogenous pressure at different conditions, given in Table-1, and then cooling the pressure bomb under running water to room temperature, separating the solid mass by filtration and drying it at 120° C. for 6 h, and (ii) by calcining the dried solid mass at 500° C. for 4 h under static air in a muffle furnace.

The surface area and XRD data were obtained by the methods described in Example 1. The surface area and XRD data for the activated perovskite-type oxide, obtained at different process conditions, are included in Table 1.

The catalytic activity of the perovskite-type oxide, before and after its activation by the process of this invention, in the complete combustion of methane to $CO_2$ and $H_2O$ was measured by passing continuously a methane-air mixture (2.5 mol% methane in air) over a homogeneous mixture of 0.1 g perovskite-type oxide and 0.4 g inert solid particles of 52–72 mesh size, packed in a tubular quartz reactor with a chromel-alumel thermocouple located axially at the center of the catalyst bed, at a GHSV (gas hourly space velocity) of 52,000 $cm^3 g^{-1} h^{-1}$ under isothermal condition at 450° C. or 500° C. or 600° C. and analyzing the product stream for the unconverted methane and reaction products (CO and $CO_2$), after removing the water from the product stream by condensation at 0° C., by an on-line gas chromatograph with thermal conductivity detector and porapak Q and spherocarb columns. Before carrying out the catalytic activity measurement, the perovskite-type oxide in the reactor was pretreated in a flow of $N_2$ (30 ml $min^{-1}$) at 600° C. for 1 h. The results of the catalytic activity tests are included in Table 1.

EXAMPLE 5

This example illustrates the process of this invention for the activation of $LaCoO_3$ perovskite-type oxide, prepared in Example 1, by its hydrothermal treatment with water vapors, under different process conditions of this invention. This example also illustrates that, the surface area and the catalytic activity (in complete combustion of methane) of $LaCoO_3$ perovskite-type oxide, prepared in Example 1, are increased markedly after the activation of this perovskite-type oxide under different conditions by the process of this invention.

The activation of perovskite-type oxide was carried out in two steps : (i) treating hydrothermally the perovskite-type oxide with water vapors by passing continuously water vapors with or without nitrogen over the perovskite-type oxide of 52–72 mesh size particles, in a tubular quartz reactor, provided with a chromel-alumel thermocouple axially at the center of bed, at the conditions given in Table 2 and then (ii) calcining the water vapor treated perovskite-type oxide in the same reactor in a flow of nitrogen (space velocity: 500 or 5040 $cm^3 .g^{-1} .h^{-1}$) at the conditions given in Table 2.

The surface area and XRD data were obtained by the methods described in Example 1. The surface area and XRD data for the activated perovskite-type oxide, obtained at different process condition, along with that for the parent perovskite-type oxide are included in Table 2.

The catalytic activity of the parent and activated perovskite-type oxides in the complete combustion of methane was measured by using the reactor and procedures same as that described in Example 4.

The results of the catalytic activity test are included in Table 2. The selectivity for $CO_2$ was 100%.

EXAMPLE 6

This example illustrates the process of this invention for the activation of $LaMn_{0.9}Co_{0.1}O_3$ perovskite-type oxide, prepared in the Example 2, by its hydrothermal treatment with liquid water with or without containing any tetrapropyl ammonium hydroxide, under different process conditions of this invention. This example illustrates that, the surface area and the catalytic activity (in complete combustion of methane) of $LaMn_{0.9}Co_{0.1}O_3$ perovskite-type oxide, prepared in Example 2, are increased markedly after the activation of this perovskite-type oxide under different conditions by the process of this invention.

The activation of the perovskite-type oxide was carried out in two steps by the procedures same as that described in Example 4 at the conditions given in Table 3.

The surface area and XRD data were obtained by the methods described in Example 1. The surface area and XRD data for the activated perovskite-type oxide, obtained at different process condition, that for the parent perovskite-type oxide are included in Table 3.

The catalytic activity of the parent and activated perovskite-type oxides in the complete combustion of methane was measured by using the reactor and procedures same as that described in Example 4.

The results of the catalytic activity test are included in Table 3. The selectivity for $CO_2$ was 100%.

EXAMPLE 7

This example illustrates the process of this invention for the activation of $La_{0.8}Sr_{0.2}FeO_3$ perovskite-type oxide, prepared in the Example 3, by its hydrothermal treatment with liquid water under different process conditions of this invention. This example illustrates that, the surface area and the catalytic activity (in complete combustion of methane) of $La_{0.8}Sr_{0.2}FeO_3$ perovskite-type oxide, prepared in Example 3, are increased markedly after the activation of this perovskite-type oxide under different conditions by the process of this invention.

The activation of the perovskite-type oxide was carried out in two steps by the procedures same as that described in Example 4 at the conditions given in Table 4. In this case the treatment of the oxide in step (i) with liquid water was carried out in the absence of any ammonium or alkyl ammonium hydroxide.

The surface area and XRD data were obtained by the similar methods described in Example 1. The surface area and XRD data for the activated perovskite-type oxide, obtained at different process condition, along with that for the parent perovskite-type oxide are included in Table 4.

The catalytic activity of the parent and activated perovskite-type oxides in the complete combustion of methane was measured by using the reactor and procedures same as that described in Example 4.

The results of the catalytic activity test are included in Table 4. The selectivity for $CO_2$ was 100%.

TABLE 1

Process conditions for the activation of LaCoO₃ type perovskite oxide prepared in Example 1 and the surface area and catalytic activity in the methane combustion of the perovskite-type oxide before and after its activation

| Process conditions in step (i) for the activation of LaCoO₃, prepared in Example 1 | | | | | | Methane conversion (%) in the combustion of methane | | |
|---|---|---|---|---|---|---|---|---|
| Conc. of TPAOH in aqueous solution (wt %) | H₂O/PTO wt. ratio | Temperature (° C.) | Period (h) | Surface area (m² · g⁻¹) | 2θ (degree) and relative intensity (%) for prominent XRD peaks | 450° C. | 500° C. | 600° C. |
| Before activation (without activation) | | | | 0.9 | 32.9°, 100%; 33.4°, 98%; 47.6°, 61%; 58.8°, 40% | 1.0 | 5.0 | 20.0 |
| 0.0 | 1.0 | 125 | 4.0 | 7.8 | 32.8°, 100%; 33.4°, 98%; 47.5°, 63%; 58.9°, 45% | 3.2 | 11.3 | 42.1 |
| 0.0 | 1.6 | 175 | 4.0 | 14.3 | 32.9°, 100%; 33.5°, 95%; 47.7°, 63%; 58.8°, 48% | 4.5 | 12.0 | 43.5 |
| 0.0 | 1.6 | 225 | 4.0 | 16.0 | 32.8°, 100%; 33.4°, 98%; 47.5°, 57%, 58.7°, 43% | 8.1 | 15.2 | 64.0 |
| 0.0 | 3.0 | 300 | 4.0 | 6.5 | 33.0°, 100%; 33.5°, 94%; 47.7°, 55%; 58.6°, 42% | 4.0 | 10.1 | 32.3 |
| 2.6 | 2.0 | 150 | 0.5 | 5.9 | 32.8°, 100%, 33.4°, 93%; 47.5°, 52%; 58.7°, 40% | 5.2 | 11.6 | 39.3 |

PTO = perovskite-type oxide

TABLE 2

Process conditions for the activation of LaCoO₃ type perovskite oxide prepared in Example 1 and results of the surface area and catalytic activity in the methane combustion of the perovskite-type oxide before and after its activation by the process described in Example 5.

| Process conditions in step (i) for the activation of LaCoO₃, prepared in Example 1 | | | | | | | | Methane conversion (%) in the combustion of methane | |
|---|---|---|---|---|---|---|---|---|---|
| Conc. of water vapors in gas stream (mol %) | space velocity (cm³ · g⁻¹ · h⁻¹) | Temperature (° C.) | Period (h) | Temperature of calcination in step (ii) (° C.) | Period of calcination in step (ii) (h) | Surface area (m² · g⁻¹) | 2θ (degree) and relative intensity (%) for prominent XRD peaks | 500° C. | 600° C. |
| Before activation (without activation) | | | | | | 0.9 | 32.9°, 100%; 33.4°, 98%; 47.6°, 61%, 58.8°, 40% | 5.0 | 20.0 |
| 50 | 5040 | 800 | 4.0 | 800 | 0.5 | 2.3 | 32.9°, 100%; 33.4°, 98%; 47.6°, 78%; 58.7°, 63% | 12.2 | 41.2 |
| 50 | 5040 | 700 | 4.0 | 700 | 0.5 | 1.9 | 32.8°, 100%; 33.5°, 96%; 47.6°, 76%; 58.7°, 62% | 9.0 | 39.1 |
| 50 | 5040 | 600 | 4.0 | 600 | 2.0 | 1.7 | 32.7°, 100%; 33.4°, 95%; 47.6°, 75%; 58.7°, 64% | 7.5 | 37.3 |
| 50 | 5040 | 500 | 4.0 | 500 | 5.0 | 1.5 | 32.9°, 100%; 33.5°, 97%; 47.6°, 72%; 58.7°, 61% | 7.0 | 35.0 |
| 100 | 500 | 350 | 16.0 | 400 | 20 | 1.4 | 32.8°, 100%; 33.3°, 98%; 47.6°, 67%; 58.8°, 54% | 6.8 | 34.1 |

PTO = perovskite-type oxide

TABLE 3

Process conditions for the activation of $LaMn_{0.9}Co_{0.1}O_3$ type perovskite oxide prepared in Example 2
and the surface area and catalytic activity in methane combustion of the perovskite-type oxide before and after its activation.

| Process conditions in step (i) for the activation of $LaMn_{0.9}Co_{0.1}O_3$, prepared in Example 2 | | | | | | | | |
|---|---|---|---|---|---|---|---|---|
| Conc. of TPAOH in aqueous solution (wt %) | H$_2$O/PTO wt. ratio | Temperature (° C.) | Period (h) | Surface area (m$^2 \cdot$ g$^{-1}$) | 2θ (degree and relative intensity (%) for prominent XRD peaks | Methane coneversion (%) in the combustion of methane | | |
| | | | | | | 450° C. | 500° C. | 600° C. |
| Before activation (without activation) | | | | 1.6 | 32.5°, 100%; 32.6°, 100%; 46.6°, 56%; 57.8°, 40% | 1.5 | 4.0 | 14.0 |
| 0.0 | 2.0 | 175 | 4.0 | 3.3 | 32.6°, 100%; 32.4°, 86%; 46.6°, 36%; 57.8°, 39% | 4.0 | 7.2 | 25.3 |
| 0.0 | 2.0 | 225 | 4.0 | 3.7 | 32.6°, 100%; 32.4°, 87%; 46.5°, 33%; 57.8°, 39% | 4.2 | 8.5 | 35.4 |
| 0.0 | 2.0 | 300 | 4.0 | 3.2 | 32.5°, 100%; 32.6°, 91%; 46.7°, 38%; 57.8°, 42% | 7.0 | 11.0 | 37.1 |
| 5.0 | 1.0 | 150 | 4.0 | 3.1 | 32.4°; 100%; 32.6°, 89%; 46.7°, 32%; 57.8°, 36% | 6.3 | 10.3 | 21.5 |

PTO = perovskite-type oxide

TABLE 4

Process conditions for the activation of $La_{0.8}Sr_{0.2}FeO_3$ type perovskite oxide prepared in
Example 3 and the surface area and catalytic activity in the methane combustion of the perovskite-type
oxide before and after its activation.

| Process conditions in step (i) for the activation of $La_{0.8}Sr_{0.2}FeO_3$, prepared in Example 3 | | | | | | | |
|---|---|---|---|---|---|---|---|
| H$_2$O/PTO wt. ratio | Temperature (° C.) | Period (h) | Surface area (m$^2 \cdot$ g$^{-1}$) | 2θ (degree and relative intensity (%) for prominent XRD peaks | Methane coneversion (%) in the combustion of methane | | |
| | | | | | 450° C. | 500° C. | 600° C. |
| Before activation (without activation) | | | 2.4 | 31.9°, 100%; 57.2°, 36%; 45.8°, 31%; 39,4°, 22% | 5.0 | 13.1 | 50.1 |
| 2.0 | 150 | 4.0 | 5.3 | 31.8°, 100%; 57.1°, 38%; 45.9°, 33%; 39.4°, 24% | 18.0 | 24.3 | 55.4 |
| 2.0 | 250 | 4.0 | 6.0 | 31.9°, 100%; 57.2°, 39%; 45.7°, 35%; 39.5°, 27% | | 25.2 | 61.1 |

PTO = perovskite-type oxide

The main novel features and advantages of the process of this invention are as follows:
1. By the process of this invention perovskite-type oxides, having low surface area, which are prepared by using simple and inexpensive methods such as from mixed metal oxides or from coprecipitated metal hydroxides or carbonates, can be activated, increasing their surface area to a large extent. Whereas the preparation of high surface area perovskite-type oxide by the prior art freeze drying and spray drying methods is very expensive because these methods require special expensive equipments and moreover the use of these methods is limited only to the highly soluble metal salts which on decomposition or calcination are converted to metal oxide.
2. Because of the activation of perovskite-type oxide by the process of this invention not only the surface area but also the catalytic activity of the perovskite-type oxide is increased to a large extent.
3. Another important advantage of the process of this invention over the prior art processes for the preparation of perovskite-type oxide is that by the process of this invention even a perovskite-type oxide deactivated due to sintering or crystal growth during its use can be regenerated by activating the deactivated perovskite-type oxide by increasing its surface area and/or catalytic activity.

We claim:
1. A process for the activation of perovskite-structured oxides, represented by a general formula:

$$[A_{(1-a)}A^*_a]_nBO_x$$

wherein A is chemical element or mixture of chemical elements selected from rare earth and other trivalent elements; A* is chemical element or mixture of chemical elements selected from alkali and alkaline earth elements, Pb, Cd, Ag, Cu, Sn and other mono and divalent elements; B is chemical element or mixture of chemical elements selected from Sc, Ti, V, Cr, Mn, Fe, Co, Ni, Y, Nb, Mo and noble metal elements; O is oxygen; a is mole fraction of A* in the mixture of A and A* in the range from 0 to 1; x is an integer having a value of 3 and 4 when n=1 and 2, respectively; by increasing the surface area and/or catalytic activity of said perovskite-structured oxides, the process for the activation of said perovskite-structured oxides comprises:
  i) treating said perovskite-structured oxide hydrothermally with liquid water with or without containing ammonium hydroxide and/or alkyl ammonium hydroxide at water/perovskite-structured oxide weight ratio above about 0.1 in a closed vessel at a temperature between about 50° C. and about 500° C. under autogenous pressure for a period between 0.1 h and about 100 h and then cooling to room temperature, separating the resulting solid mass by filtration, and drying the said mass, and ii) calcining the perovskite-structured oxide treated in step (i) at a temperature between about 300° C. and about 1000° C. in air or inert gas or under vacuum for a period between about 0.1 h and about 100 h.

2. A process as claimed in claim 1, wherein the water/perovskite-structured oxide weight ratio is between about 1.0 and about 3.0.

3. A process as claimed in claim 1, wherein the temperature of the liquid water treatment is between about 100° C. and about 300° C.

4. A process as claimed in claim 1, wherein the period of the liquid water treatment is between about 0.5 h and about 20 h.

5. A process as claimed in claim 1, wherein the temperature of calcination in step (ii) is between about 400° C. and about 800° C.

6. A process as claimed in claim 1, wherein the period of calcination in step (ii) is between about 0.5 h and about 20 h.

7. A process for the activation of perovskite-structured oxides, represented by a general formula:

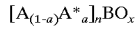

$$[A_{(1-a)}A^*_a]_n BO_x$$

wherein A is chemical element or mixture of chemical elements selected from rare earth and other trivalent elements; A* is chemical element or mixture of chemical elements selected from alkali and alkaline earth elements, Pb, Cd, Ag, Cu, Sn and other mono and divalent elements; B is chemical element or mixture of chemical elements selected from Sc, Ti, V, Cr, Mn, Fe, Co, Ni, Y, Nb, Mo and noble metal elements; O is oxygen; a is mole fraction of A* in the mixture of A and A* in the range from 0 to 1; x is an integer having a value of 3 and 4 when n=1 and 2, respectively; by increasing the surface area and/or catalytic activity of said perovskite-structured oxides, the process for the activation of said perovskite-structured oxides comprises:

i) treating said perovskite-structured oxide with water vapor by contacting it with steam in presence or absence of air or any inert gas at a gas hourly space velocity above 100 $h^{-1}$, at a temperature between about 200° C. and about 1000° C. for a period between about 0.1 h and about 100 h, and ii) calcining the perovskite-structured oxide treated in step (i) at a temperature between about 300° C. and about 1000° C. in air or inert gas or under vacuum for a period between about 0.1 h and about 100 h.

8. A process as claimed in claim 7, wherein the water/perovskite-structured oxide weight ratio is between about 1.0 and about 3.0.

9. A process as claimed in claim 7, wherein the temperature of the water vapor treatment is between about 300° C. and about 800° C.

10. A process as claimed in claim 7, wherein the period of the water vapor treatment is between about 0.5 h and about 20 h.

11. A process as claimed in claim 7, wherein the temperature of calcination in step (ii) is between about 400° C. and about 800° C.

12. A process as claimed in claim 7, wherein the period of calcination in step (ii) is between about 0.5 h and about 20 h.

* * * * *